United States Patent Office
2,895,842
Patented July 21, 1959

2,895,842

ESTERS OF 4-(4'-TOLYLSULFONYL)-BENZOIC ACID AND RESINOUS COMPOSITIONS PLASTICIZED THEREWITH

John R. Caldwell and James C. Martin, Kingsport, Tenn., assignors to Eastman Kodak Company, Rochester, N.Y., a corporation of New Jersey No Drawing. Application February 13, 1956
Serial No. 564,890

8 Claims. (Cl. 106—179)

This invention relates to the alkoxyalkyl and alkoxyalkoxyalkyl esters of 4-(4'-tolylsulfonyl)-benzoic acid and to their employment as plasticizers in plastic compositions such as synthetic resins and cellulose esters.

This invention also relates to the manufacture of 4-(4'-tolylsulfonyl)-benzoic acid which is a new compound and has the following formula:

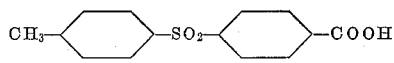

The pressure oxidation of toluene to form benzoic acid using nitric acid is known. It is also known that 4,4'-ditolylsulfone can be oxidized using nitric acid under pressure to form 4,4'-sulfonyldibenzoic acid. Moreover, the prior art describes the oxidation of p-xylene to form terephthalate acid using nitric acid under pressure as well as the partial oxidation of p-toluene to form toluic acid. In contrast to the prior art, the oxidation process of this invention is unique because it results in the selective oxidation in good yield of only one methyl group from the two methyl groups which are present in 4,4'-ditolylsulfone even though these methyl groups are in identical positions on separate benzene rings. This result is quite unobvious.

The use of various esters of organic acids as plasticizers for plastic compositions is well known in the art. Equally well known are numerous shortcomings of such plasticizers in general. It is therefore surprising to discover that the alkoxyalkyl esters and the alkoxyalkoxyalkyl esters of 4-(4'-tolylsulfonyl)-benzoic acid are of exceptional value as plasticizers for synthetic resins, cellulose esters and related plastic compositions. Thus, these esters of this novel acid are especially valuable as plasticizers because they show excellent permanent properties especially in thin films. These plasticizers of this invention have an extremely low vapor pressure. Hence such plastic compositions have an extremely high resistance to loss of plasticizer even at temperatures of 100° C.–120° C. In addition, the plasticizers of this invention are very insoluble in water and as a consequence the plastic compositions embodying these plasticizers are strongly resistant to deterioration caused by water and aqueous solutions.

It is an object of this invention to provide 4-(4'-tolylsulfonyl)-benzoic acid and esters thereof together with a process for preparation thereof.

More particularly, it is a further object of this invention to provide the alkoxyalkyl and alkoxyalkoxyalkyl esters of 4-(4'-tolylsulfonyl)-benzoic acid.

It is a further object of this invention to provide plastic compositions containing an alkoxyalkyl or an alkoxyalkoxyalkyl ester of 4-(4'-tolylsulfonyl)-benzoic acid as a plasticizer.

It is a further object of this invention to provide improved plastic compositions containing plasticizers which possess extremely low vapor pressure, resistance to loss by volatilization at temperatures in excess of 100° C., insolubility in water, excellent resistance to extraction by water and aqueous solutions, and other excellent permanence properties.

According to an embodiment of this invention 4-(4'-tolylsulfonyl)-benzoic acid is produced by a process which comprises reacting 4,4'-ditolylsulfone with about 1 to about 1.5 mole proportions of $HNO_3$ in the form of an aqueous solution containing from about 20 to 40% $HNO_3$ by weight of such solution in a closed vessel at a temperature of from about 160° to about 180° C.

It is advantageous to conduct this reaction for a period of from about 1 to 6 hours followed by isolation of the desired product. Such isolation can advantageously be accomplished by means of an alkali extraction followed by acidification and subsequent recrystallization employing techniques well known in the art.

The preferred temperature for this reaction is about 165° C. and should not exceed about 180° C. since at temperatures as high as 190° C. the reaction results in the formation of the undesired dibasic acids. Temperatures much below 160° C. necessitate the employment of an unnecessarily extended reaction period.

The mole proportions of 4,4'-ditolylsulfone and $NHO_3$ should theoretically be 4 to 6 as shown by the following chemical equation:

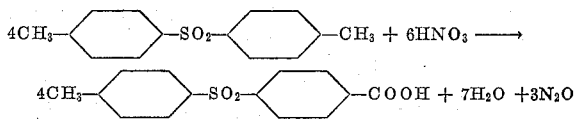

High yields are obtained when an excess of 4,4'-ditolylsulfone over the stoichiometric amount is used. Advantageously, from about 1 to about 1.5 mole proportions of $HNO_3$ can be employed for each mol proportion of the 4,4'-ditolylsulfone.

Since the reaction is exothermic, the initial temperature surge must be controlled in order to prevent undesirable formation of the dibasic acid.

An example of the preparation of 4-(4'-tolylsulfonyl)-benzoic acid is set forth in Example 1 hereinbelow.

The esters of this acid can be advantageously produced by esterification with a monoalkyl ether or a monoalkoxyalkyl ether of an alkylene glycol having the formula R'—O—R'—OH wherein each R' represents an alkyl or an alkoxyalkyl radical having from 1 to 8 carbon atoms in each alkyl or alkylene radical. Most advantageously each such radical contains from 1 to 4 carbon atoms. The esterification reaction is advantageously conducted in the presence of an esterification catalyst at an elevated temperature.

Esterifying agents which can be employed include sulfuric acid, p-toluenesulfonic acid, and various other compounds which are known to catalyze esterification reactions, e.g. hydrochloric acid, ethylsulfuric acid, ethylsulfonic acid, benzenesulfonic acid, trichloroacetic acid, zinc chloride, etc. Generally speaking, we advantageously employ either p-toluenesulfonic acid or sulfuric acid since they are readily available, quite effective, and produce no undesirable side reactions; however, it is quite apparent that most of the commonly known esterification catalysts could also be used.

The monoalkyl ethers of alkylene glycols which we can employ are defined by the general formula set forth above and include ethylene glycol monobutyl ether, ethylene glycol monomethyl ether, ethylene glycol monoethyl ether, propylene glycol monoethylether, butlene glycol monoethyl ether, ethylene glycol monohexyl ether, etc. Quite advantageously, we employ the ethylene glycol monoalkyl ethers in most instances. Most advantageously, we employ ethylene glycol monoethyl ether. In addition to the monoalkyl ethers, various monoalkoxyalkyl ethers can be similarly employed, e.g. ethylene glycol monoethoxyethyl ether, etc.

The esterification reaction can be advantageously conducted under conditions that allow the water which is formed to be removed. It is generally advantageous to conduct the reaction under a reflux condition which allows the water formed to distill off. Periods of time of several hours duration are required to obtain good yields, e.g. 5 to 20 hours; however, longer or shorter periods of time can be employed. The products obtained can be advantageously isolated by washing with water. In some cases they may be distilled in a molecular still. Most of the products obtained are liquids. The yields are usually in the vicinity of 65–80 percent.

The ester compounds of this invention can also be prepared by employing the acid chlorides instead of the carboxy acids as starting materials.

In employing the process described above, the alkylene glycol ethers are advantageously employed in considerable excess in order to obtain good yields. The theoretical amount required is one mol per mol of the 4-(4'-tolylsulfonyl)-benzoic acid; however, it is advantageous to employ a considerable excess of the ether over that theoretically required. From 2 to 5 mols can be employed advantageously per mol of the acid; however, lower or higher proportions can also be employed.

The resulting esters can be readily separated from the reaction mixture by distilling off the excess alkylene glycol monoalkyl ether under a vaccum and then washing the residue with a dilute aqueous alkaline solution, e.g. potassium hydroxide, sodium hydroxide, various alkaline salts such as sodium carbonate, etc., to neutralize the esterification catalyst. The ester can then be purified by recrystallization from ethyl alcohol or other inert solvent, e.g. dioxane, methyl alcohol, etc.

The alkoxyalkyl and alkoxyalkoxyalkyl esters can also be produced by other methods, thus, 4-(4'-tolylsulfonyl)-benzoic acid can be heated with a molecular excess of $PCl_5$ to form the acid chloride. Upon further heating the HCl and $POCl_3$ which forms and the excess $PCl_5$ can be driven off and the remainder comprising the crude acid chloride of 4-(4'-tolylsulfonyl)-benzoic acid can then be converted to the ester by dissolving it in an excess of an alkylene glycol ether and heating the mixture in a vacuum to remove the HCl which forms and the excess alkylene glycol monoalkyl ether. The resulting alkoxyalkyl ester of 4-(4'-tolylsulfonyl)-benzoic acid can then be separated and purified as described previously.

Examples of alkoxyalkyl and alkoxyalkoxyalkyl esters which can be prepared according to these processes include, as examples, the methoxyethyl ester of 4-(4'-tolylsulfonyl)-benzoic acid, the ethoxyethyl ester, the butoxyethyl ester, the ethoxypropyl ester, the methoxyhexyl ester, the propoxybutyl ester, the ethoxyethoxyethyl ester, the butoxyethoxyethyl ester, etc.

The alkoxyalkyl and alkoxyalkoxyalkyl esters can be advantageously employed as plasticizers for the lower aliphatic saturated monoacid (acyl) esters of cellulose, e.g. cellulose acetate, cellulose propionate, cellulose acetate-propionate, cellulose acetate-butyrate, cellulose propionate-butyrate, etc. These esters can also be employed as plasticizers for other cellulose derivatives such as cellulose nitrate, various cellulose ethers, e.g. ethyl cellulose, benzyl cellulose, etc. The esters can furthermore be employed to plasticize synthetic resins derived essentially from monoethylenically-unsaturated, polymerizable compounds which comprise those containing a $$=CH=C=$$

group. Exemplary compounds include such compounds as styrene, α-methylstyrene, p-acetaminostyrene, α-acetoxystyrene, vinyl chloride (when chloride monomer is vinylidene chloride), vinylidene chloride (when chloride monomer is vinyl chloride), ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinylphthalimide, ethylene, vinyl esters (e.g. vinyl acetate), vinyl alcohol, acrylamides (e.g. N-isopropylacrylamide), maleamides (e.g. N, N'-methylethylmaleamide), fumaramides (e.g. N-n-butylfumaramide), itaconamides (e.g. N-ethylitaconamide), citraconamides (e.g. N,N'-tetramethylcitraconamide), maleamates (e.g. N-ethylmethylmaleamate), fumaramates (e.g. N-methyl di-n-butylfumaramate), itaconamates (e.g. propyl itaconamate), citraconamates, acrylates (e.g. methyl acrylate), methacrylates (e.g. ethyl methacrylate)-trifluorovinyl acetate, tetrafluoroethylene, 1,1-difluoro-2,2-dichloroethylene, etc. Especially useful polymerizable compounds coming within the scope of this case comprise those containing a $CH_2=C<$ group.

The alkoxyalkyl and alkoxyalkoxyalkyl esters of 4-(4'-tolylsulfonyl)-benzoic acid can be incorporated into these resins in any manner known in the prior art. They can be employed in combination with other plasticizers, e.g. diethyl phthalate, triphenyl phosphate, dibutyl adipate, di-2-ethylhexyladipate, etc. Generally, it is advantageous to employ the alkoxyalkyl and alkoxyalkoxyalkyl esters in the amount of from about 15 to about 70% by weight of the resinous material into which they are being incorporated. Of course, higher or lower percentages can be used. Usual methods which can be employed for incorporating these plasticizers into synthetic resins include intermixing the plasticizer and resin on mixing rolls, churns, etc. The plasticizers can also be advantageously incorporated into a dope or solution of the resin to be plasticized with the solvent being removed subsequently to form a sheet film, or coating, etc. which is tough, clear and hard-surfaced. The solvents which can be employed are innumerable. Examples of solvents which can be advantageously employed include alkyl alcohols, e.g. methyl alcohol, ethyl alcohol, etc., various ketones, e.g. acetone, etc, and numerous other industrial solvents which are reactively inert to the alkoxyalkyl and alkoxyalkoxyalkyl esters. These techniques apply to plastic compositions in general which include synthetic resins as well as cellulose esters, etc.

This invention can be further illustrated by the following examples of preferred embodiments although it will be understood that these examples are included merely for purposes of illustration and are not intended to limit the scope of the invention unless otherwise specifically indicated.

*Example 1.—Preparation of 4-(4'-tolylsulfonyl)-benzoic acid and esters thereof*

One hundred fifty-six grams of 4,4'-ditolylsulfone (0.63 mole) and 177 g. of 30% nitric acid (0.84 mole) were charged into a one liter, stainless steel, rocking autoclave. The autoclave was heated to 165° C., and as soon as this temperature was reached the heating element was shut off and a stream of cold air was blown on the autoclave to control the exothermic reaction. The temperature was kept below 175° C. After this initial reaction, the autoclave was maintained at 165° C. for 4 hours. After cooling, the contents of the autoclave were poured into two liters of water and filtered. The solid was washed with two liters of hot water. The solid was heated with excess 10% sodium hydroxide solution and filtered. The residue was unreacted 4,4'-ditolylsulfone. The filtrate was boiled with activated charcoal and filtered. The filtrate was acidified with 5% hydrochloric acid solution and filtered. The solid was washed with water and dried. This material weighed 104.3 g. and titration showed it to be a mixture of monobasic acid and some dibasic acid. This mixture was boiled with 600 cc. of dioxane and filtered hot. The filtrate was evaporated to dryness. The residue weighed 80.4 g. and titration showed it to be 4-(4'-tolylsulfonyl)- benzoic acid of better than 95% purity. This represents a yield of 65% of 4-(4'-tolylsulfonyl)-benzoic acid, based on 4,4'-ditolylsulfone.

The acid obtained above was recrystallized once from dioxane-water mixture and once from methyl cellosolve-water mixture, using decolorizing charcoal each time. This product had the following analysis:

M.P. 284–287° C.
Percent S (found)—11.44; (theoretical)—11.6
Percent C (found)—61.04; (theoretical)—60.9
Percent H (found)—4.55; (theoretical)—4.35
Neutralization equivalent (found)—272; (theoretical)—276

The methoxyethyl, ethoxyethyl, butoxyethyl, methoxyethoxyethyl, and ethoxyethoxyethyl esters of this acid were prepared by refluxing approximately 1 mol proportion of the acid with from about 4 to 10 mole proportions of the corresponding monoalkyl ether and monoalkoxyalkyl ether of an alkylene glycol in the presence of ethyl p-toluene sulfonic acid or sulfuric acid under conditions that allowed the water formed by the esterification reaction to distill. The refluxing was continued until a clear solution was obtained and the excess of the monoalkylether or monoalkoxyalkyl ether of the alkylene glycol was removed by fractionation under a vacuum. The remaining residue was then washed with a dilute aqueous solution of sodium hydroxide and was recrystallized from alcohol producing a good yield of the various esters of 4-(4'-tolylsulfonyl)-benzoic acid.

*Example 2.—Plasticized cellulose acetate-butyrate*

One hundred parts cellulose acetate-butyrate and thirty parts of the ethoxyethyl ester of 4-(4'-tolylsulfonyl)-benzoic acid were mixed on heated rolls, cut into sheets, and granulated. The product was molded on a standard injection press. The molded specimens had a high impact strength and showed substantially no loss in plasticizer when heated at 100° C. for 24 hours. The resistance to extraction by water was also very good.

*Example 3.—Plasticized cellulose acetate-butyrate*

One hundred parts cellulose acetate-butyrate and 20 parts of the ethoxyethoxyethyl ester of 4-(4'-tolylsulfonyl)-benzoic acid were dissolved in a mixture of 300 parts methylene chloride and 40 parts of methyl alcohol. Films were cast having a thickness of 0.010 inch. The films were clear, tough, and flexible. There was substantially no loss of plasticizer when the films were heated at 100° C. for 24 hours. The resistance to extraction by water was also very good.

*Example 4.—Plasticized polyvinyl chloride*

One hundred parts of polyvinyl chloride and 70 parts of the ethoxyethyl ester of 4-(4'-tolylsulfonyl)-benzoic acid were mixed on hot rolls and the mixture was extruded to give a sheet 0.006 inch thick. The sheet was strong and flexible. It showed substantially no loss of plasticizer when soaked in water for 96 hours. There was very little loss of plasticizer when the film was heated at 100° C. for 24 hours.

*Example 5.—Plasticized polyvinyl chloride*

One hundred parts of polyvinyl chloride and 50 parts of butoxyethyl ester of 4-(4'-tolylsulfonyl)-benzoic acid were dissolved in 400 parts of methylene chloride. Films cast from the solution were strong, flexible and had excellent permanence properties.

Other dopes and molding compositions can also be prepared using other alkoxyalkyl and alkoxyalkoxyalkyl esters such as the butoxyethyl ester, the hexoxymethyl ester, the pentoxypropoxyethyl ester, the ethoxypropyl ester, etc. and employing other resins such as the vinyl resins referred to above. Thus, 20% by weight of the butoxyethyl ester can be incorporated on hot rolls into any of the above-described synthetic resins or cellulose esters and subsequently formed into injection-molded products possessing excellent surface characteristics. Similarly, other dopes can be prepared, for example, by preparing a solution in acetone of polystyrene containing 35% by weight of the resin of a mixture of the ethoxypropyl and the methoxyethyl esters of 4-(4'-tolylsulfonyl)-benzoic acid from which sheets or films can be produced possessing excellent surface characteristics.

Although the invention has been described in considerable detail with reference to certain preferred embodiments thereof, it will be understood that various modifications can be effected without departing from the spirit of the invention as defined hereinabove and as defined in the appended claims.

We claim:
1. A plasticized plastic composition selected from the group consisting of a lower alkanoic acid ester of cellulose and a polymerization product of a resin forming mono-ethylenically unsaturated compound, which plasticized plastic composition contains as a plasticizer a substantial proportion of a compound having the following general formula:

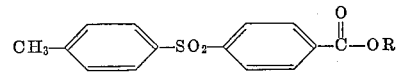

wherein R is a member selected from the group consisting of an alkoxyalkyl radical and an alkoxyalkoxyalkyl radical having from 1 to 8 carbon atoms in each alkyl or alkylene group.

2. A plasticized lower alkanoic acid ester of cellulose containing as a plasticizer a substantial proportion of a compound having the following general formula:

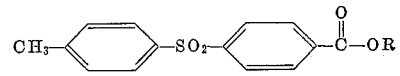

wherein R is a member selected from the group consisting of an alkoxyalkyl radical and an alkoxyalkoxyalkyl radical having from 1 to 8 carbon atoms in each alkyl or alkylene group.

3. Plasticized cellulose acetate butyrate containing a substantial proportion of the ethoxyethyl ester of 4-(4'-tolylsulfonyl) benzoic acid.

4. Plasticized cellulose acetate butyrate containing a substantial proportion of the ethoxyethoxyethyl ester of 4-(4'-tolylsulfonyl) benzoic acid.

5. A plasticized polymerization product of a resin forming mono-ethylenically unsaturated compound containing as a plasticizer a substantial proportion of a compound having the following general formula:

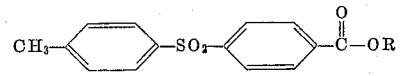

wherein R is a member selected from the group consisting of an alkoxyalkyl radical and an alkoxyalkoxyalkyl radical having from 1 to 8 carbon atoms in each alkyl or alkylene group.

6. Plasticized polyvinyl chloride containing a substantial proportion of the ethoxyethyl ester of 4-(4'-tolylsulfonyl) benzoic acid.

7. Plasticized polyvinyl chloride containing a substantial proportion of the butoxyethyl ester of 4-(4'-tolylsulfonyl) benzoic acid.

8. Plasticized polyvinyl chloride containing a substantial proportion of the ethoxyethoxyethyl ester of 4-(4'-tolylsulfonyl) benzoic acid.

References Cited in the file of this patent
UNITED STATES PATENTS 2,124,884   Meyer   July 26, 1938
2,173,181   Robinson   Sept. 19, 1939

(Other references on following page)

UNITED STATES PATENTS

| | | |
|---|---|---|
| 2,264,927 | Albrecht | Dec. 2, 1941 |
| 2,320,217 | Bruson | May 25, 1943 |
| 2,339,789 | Lontz | Jan. 25, 1944 |
| 2,356,586 | Hentrich et al. | Aug. 22, 1944 |
| 2,463,224 | Vincent | Mar. 1, 1949 |
| 2,689,864 | Emerson et al. | Sept. 21, 1954 |
| 2,728,738 | Caldwell | Dec. 27, 1955 |

FOREIGN PATENTS

| | | |
|---|---|---|
| 555,314 | Great Britain | Aug. 17, 1943 |

OTHER REFERENCES

The Metalation of Diaryl Sulfones. II, Phenyl p-Tolyl Sulfone and Dimesityl Sulfone, Truce et al., J. Am. Chem. Soc. 75, pages 6023–5 (1953).